(12) United States Patent
Wu

(10) Patent No.: US 11,349,650 B2
(45) Date of Patent: May 31, 2022

(54) CIRCUITS FOR DATA ENCRYPTION AND DECRYPTION, AND METHODS THEREOF

(71) Applicant: BOE Technology Group Co., Ltd., Beijing (CN)

(72) Inventor: Congrui Wu, Beijing (CN)

(73) Assignee: BOE Technology Group Co., Ltd., Beijing (CN)

(*) Notice: Subject to any disclaimer, the term of this patent is extended or adjusted under 35 U.S.C. 154(b) by 28 days.

(21) Appl. No.: 16/960,053

(22) PCT Filed: Dec. 16, 2019

(86) PCT No.: PCT/CN2019/125588
§ 371 (c)(1),
(2) Date: Jul. 3, 2020

(87) PCT Pub. No.: WO2020/177438
PCT Pub. Date: Sep. 10, 2020

(65) Prior Publication Data
US 2021/0250170 A1    Aug. 12, 2021

(30) Foreign Application Priority Data
Mar. 6, 2019    (CN) .......................... 201910168811.5

(51) Int. Cl.
*H04L 9/08* (2006.01)
*H04L 9/06* (2006.01)
*G11C 7/22* (2006.01)

(52) U.S. Cl.
CPC ............ *H04L 9/0869* (2013.01); *G11C 7/222* (2013.01); *H04L 9/0625* (2013.01); *H04L 9/0866* (2013.01)

(58) Field of Classification Search
CPC ... H04L 9/0869; H04L 9/0625; H04L 9/0866; H04L 9/0872; H04L 9/12; G06F 13/382; G06F 13/409; G06F 13/4221; G11C 7/222
See application file for complete search history.

(56) References Cited

U.S. PATENT DOCUMENTS 5,438,622 A * 8/1995 Normile ................. H04L 9/12
                                                  331/78
10,585,827 B1 * 3/2020 Cannata ............. G06F 13/4221
(Continued)

FOREIGN PATENT DOCUMENTS

CN        1601578 A       3/2005
CN      101969376 A       2/2011
(Continued)

OTHER PUBLICATIONS

International Search Report & Written Opinion dated Mar. 19, 2020, regarding PCT/CN2019/125588.
(Continued)

*Primary Examiner* — Jung W Kim
*Assistant Examiner* — Sangseok Park
(74) *Attorney, Agent, or Firm* — Intellectual Valley Law, P.C.

(57) ABSTRACT

A circuit for data encryption is provided. The circuit includes an encryption controller configured to randomly generate a frequency parameter defining different timeframes corresponding to different frequencies. The circuit also includes a random-clock-signal generator configured to receive the frequency parameter to synthesize an encryption clock signal based on a base clock signal. The encryption clock signal includes a random combination of different clock frequencies respectively over multiple different timeframes. Additionally, the circuit includes an encryption sub-circuit configured to receive plain data and to encrypt
(Continued)

the plain data by a sampling replacement driven by the encryption clock signal to obtain encrypted data.

19 Claims, 8 Drawing Sheets

(56) References Cited

U.S. PATENT DOCUMENTS

| | | | |
|---|---|---|---|
| 10,686,458 B1* | 6/2020 | Xiu | H03L 7/18 |
| 2005/0055596 A1* | 3/2005 | Abe | H04L 9/0618 |
| | | | 713/500 |
| 2008/0010218 A1 | 1/2008 | Zank | |
| 2010/0067685 A1* | 3/2010 | Okita | H04L 9/003 |
| | | | 380/28 |
| 2011/0299678 A1* | 12/2011 | Deas | H04L 9/003 |
| | | | 380/28 |
| 2012/0223749 A1* | 9/2012 | Sasaki | G06F 1/12 |
| | | | 327/141 |
| 2017/0244546 A1* | 8/2017 | Stark | G06F 7/588 |
| 2020/0005728 A1* | 1/2020 | Kurd | H03L 7/183 |

FOREIGN PATENT DOCUMENTS

| | | |
|---|---|---|
| CN | 103560876 A | 2/2014 |
| CN | 103607275 A | 2/2014 |
| CN | 105512573 A | 4/2016 |
| CN | 107577964 A | 1/2018 |
| CN | 107735981 A | 2/2018 |
| EP | 1496641 A2 | 1/2005 |

OTHER PUBLICATIONS

First Office Action in the Chinese Patent Application No. 201910168811.5, dated Feb. 26, 2020; English translation attached.
Second Office Action in the Chinese Patent Application No. 201910168811.5, dated Nov. 17, 2020; English translation attached.

* cited by examiner

CIRCUITS FOR DATA ENCRYPTION AND DECRYPTION, AND METHODS THEREOF

CROSS-REFERENCE TO RELATED APPLICATION

This application is a national stage application under 35 U.S.C. § 371 of International Application No. PCT/CN2019/125588 filed Dec. 16, 2019, which claims priority to Chinese Patent Application No. 201910168811.5, filed Mar. 6, 2019, the contents of which are incorporated by reference in the entirety.

TECHNICAL FIELD

The present invention relates to data encryption and decryption technology, more particularly, to a circuit for data encryption and a circuit for data decryption based on dynamic frequency-varying clock signals, and methods thereof.

BACKGROUND

Information security become a focal point more and more as computer technology and communication technology develop rapidly. Many data encryption techniques have been developed for securing digital information. Compared with software encryption techniques, hardware encryption technique has advantages of consuming less resources and performing faster encryption, showing greater potential of using hardware data encryption for securing digital information for all kinds of electronic devices. Yet, improved hardware encryption and decryption techniques are desired.

SUMMARY

In an aspect, the present disclosure provides a circuit for data encryption. The circuit includes an encryption controller configured to randomly generate a frequency parameter defining different timeframes corresponding to different frequencies. Additionally, the circuit includes a random-clock-signal generator configured to receive the frequency parameter to synthesize an encryption clock signal based on a base clock signal. The encryption clock signal includes a random combination of different clock frequencies respectively over multiple different timeframes. Furthermore, the circuit includes an encryption sub-circuit configured to receive plain data and to encrypt the plain data by a sampling replacement driven by the encryption clock signal to obtain encrypted data.

Optionally, the encryption controller is configured to receive an encryption command and to generate the frequency parameter based on the encryption command using an encryption-key-generation algorithm. The frequency parameter includes a group of frequencies $f_k$ and a group of numbers $n_k$, where k is a serial number varying from 1 to m. $n_k$ represents number of cycle periods of the frequency $f_k$ lasted in a respective one of multiple different timeframes. $n_k$ is selected from any integers greater than 2.

Optionally, the encryption-key-generation algorithm is selected from one of symmetric-key algorithms, Data Encryption Standard (DES) encryption algorithm, International Data Encryption Algorithm (IDEA).

Optionally, the random-clock-signal generator includes a base clock signal generator configured to receive an input clock signal having an input frequency from a crystal oscillator and to generate the base clock signal as a periodic signal with a base clock frequency equal to the input frequency multiplying a multiplication factor.

Optionally, the circuit further includes a read-only memory stored the frequency parameter generated by the encryption controller and a base-time unit $T_A$.

Optionally, the random-clock-signal generator includes a base clock-signal generator configured to receive an input clock signal having an input frequency from a crystal oscillator, to generate two or more first clock signals having a relative time delay between effective edges of two subsequent first clock signals equal to the base-time unit $T_A$, and to generate the base clock signal as a periodic signal with a base clock period equal to $2T_A$ multiplying an integer factor.

Optionally, the random-clock-signal generator further includes a frequency controller coupled to the encryption controller to receive the frequency parameter, and a frequency-varying clock-signal generation sub-circuit coupled to the frequency controller the base clock-signal generator to generate the encryption clock signal based on the base clock signal and the frequency parameter. The encryption clock signal includes a random combination of multiple clock frequencies being limited as different integer divisions of the base clock frequency over respective timeframes being limited as different number of cycle periods equal to integer multiplications of the base-time unit $T_A$.

Optionally, the random-clock-signal venerator is a time-averaged-frequency direct-period synthesis (TAF-DPS) clock-signal generator and a respective one of the multiple clock frequencies of the encryption clock signal lasts at least three cycle periods in a respective one of the multiple different timeframes.

Optionally, the circuit further includes a random-binary-sequence generator configured to receive the base clock signal to generate a random binary sequence. The encryption sub-circuit is configured to receive the random binary sequence from the random-binary-sequence generator to combine with the plain data to obtain a combined binary sequence, and to perform a respective one sampling replacement for data in the combined binary sequence corresponding to a respective one of effective edges of the encryption clock signal with different clock frequencies appeared respectively in multiple different timeframes to obtain the encrypted data.

Optionally, the effective edges of the encryption clock signal are either rising edges or falling edges of respective signal pulses with different clock frequencies appeared respectively in multiple different timeframes.

Optionally, the circuit further includes a phase synchronizer coupled to the random-clock-signal generator to receive the base clock signal and the encryption clock signal, to perform a phase synchronization, to send the base clock signal synchronized with the encryption clock signal to the random-binary-sequence generator, and to send the encryption clock signal synchronized in phase with the base clock signal to the encryption sub-circuit.

In another aspect, the present disclosure provides a circuit for data decryption. The circuit includes a decryption controller configured to obtain a frequency parameter associated with an encryption clock signal based on a decryption command, the frequency parameter defining different timeframes corresponding to different frequencies. The circuit further includes a random-clock-signal generator configured to receive the frequency parameter and to synthesize a decryption clock signal based on a base clock signal. The decryption clock signal includes a combination of different clock frequencies respectively over multiple different timeframes. Additionally, the circuit includes a phase synchronizer configured to synchronize the base clock signal and the decryption clock signal. Furthermore the circuit includes a decryption sub-circuit configured to receive encrypted data based on respective effective edges of the base clock signal, to determine to-be-decrypted data based on effective rising or falling edges of the decryption clock signal that are synchronized in phase with some of the effective rising or falling edges of the base clock signal, and to decrypt the to-be-decrypted data to obtain plain data.

Optionally, the decryption controller is configured to read the frequency parameter from a read-only memory pre-downloaded from an encryption controller. The frequency parameter is generated by the encryption controller and is used together with the base clock signal to generate the encryption clock signal for driving an encryption sub-circuit to produce the encrypted data from which the to-be-decrypted data is sampled.

In yet another aspect, the present disclosure provides an apparatus for data encryption and decryption. The apparatus includes a read-only memory storing a base-time unit. The apparatus further includes a controller configured to receive an encryption command to randomly generate a frequency parameter defining different timeframes corresponding to different frequencies saved in the read-only memory, and to receive a decryption command to retrieve the frequency parameter from the read-only memory. Additionally, the apparatus includes a random-clock-signal generator configured to generate a synthesized clock signal based on the frequency parameter received from the controller and a base clock signal derived from the base-time unit. The synthesized clock signal includes a combination of different clock frequencies respectively over multiple different timeframes. The apparatus further includes a phase synchronizer configured to synchronize the synthesized clock signal in phase with the base clock signal. Furthermore, the apparatus includes an encryption sub-circuit configured to receive plain data, to perform a sampling replacement to determine to-be-encrypted data based on effective rising or falling edges of the synthesized clock signal, and to encrypt the to-be-encrypted data to obtain the encrypted data. Moreover, the apparatus includes a decryption sub-circuit configured to receive the encrypted data based on effective rising or falling edges of the base clock signal, to determine to-be-decrypted data based effective rising or falling edges of the synthesized clock signal synchronized in phase with some of the effective rising or falling edges of the base clock signal, and to decrypt the to-be-decrypted data to obtain plain data.

Optionally, the apparatus is a plug-in cartridge configured in a (Field Programmable Gate Arrays) FPGA integrated circuit chip.

Optionally, the plug-in cartridge includes a communication interface selected from one of a Universal Serial Bus (USB), a peripheral component interconnect express (PCIE), a mini serial AT attachment (mSATA) for communicating with a host electronic device selected from one of a personal computer, a server computer, a mobile terminal, a cloud-computing system to receive the encryption command or the decryption command and to encrypt or decrypt a storage device therein and data stored in the storage device.

In still another aspect, the present disclosure provides a method for encrypting data and decrypting data using the apparatus described herein. The method includes a step of receiving an encryption command and an input clock signal from a crystal oscillator. The method further includes a step of generating a frequency parameter in response to the encryption command and a base clock signal based on the input clock signal. The frequency parameter defines different timeframes corresponding to different frequencies. Additionally, the method includes a step of generating an encryption clock signal based on the base clock signal and the frequency parameter. The encryption clock signal includes a combination of different clock frequencies being different integer divisions of a base clock frequency associated with the base clock signal over multiple timeframes being different integer multiplications of cycle periods corresponding to the respective clock frequencies. Furthermore, the method includes a step of receiving plain data by sampling based on respective effective edges of the encryption clock signal.

Optionally, the effective edges of the encryption clock signal is selected to be either rising edges or falling edges of signal pulses with the different clock frequencies appeared over multiple different timeframes.

Optionally, the method further includes a step of synchronizing the encryption clock signal and the base clock signal to make the effective edges of the encryption clock signal be aligned in phase with some effective edges of the base clock signal.

Optionally, the step of generating a base clock signal based on the input clock signal includes a sub-step of generating at least two first clock signals based on the input clock signal, a sub-step of determining a timespan between two effective edges of two subsequent first clock signals based on time sequence of generating the at least two first clock signals, sub-step of setting the timespan equal to a base-time unit, and a sub-step of generating a base clock signal with a clock frequency being an integer division of a base clock frequency defined by the base-time unit.

Optionally, the method further includes a step of generating a random binary sequence based on the base clock signal. Furthermore, the method includes a step of combining the random binary sequence with the plain data based on the encryption clock signal to obtain a combined binary sequence. Moreover, the method includes a step of encrypting the combined binary sequence based on a symmetric-encryption algorithm to obtain encrypted data.

Optionally, the step of combining the random binary sequence with the plain data includes a sub-step of determining a first data in the random binary sequence and a second data in the plain data corresponding to a respective one of effective edges of the encryption clock signal, and a sub-step of replacing the first data with a respective second data to obtain the combined binary sequence.

Optionally, the method further includes a step of receiving a decryption command and obtaining, in response to the decryption command, the frequency parameter and the base clock signal used for generating the encryption clock signal to obtain the encrypted data. Additionally, the method includes a step of generating a decryption clock signal based on the frequency parameter and the base clock signal. The decryption clock signal includes a combination of different clock frequencies being different integer divisions of a base clock frequency associated with the base clock signal over multiple different timeframes. The method further includes a step of synchronizing the decryption clock signal and the base clock signal to make effective rising or falling edges of the decryption clock signal be aligned in phase with some effective rising or falling edges of the base clock signal. Furthermore, the method includes a step of reading the encrypted data based on respective effective rising or falling edges of the base clock signal. The method also includes a step of sampling to-be-decrypted data decryption clock signal based on effective rising or falling edges of the decryption clock signal that are synchronized in phase with some of the effective rising or falling edges of the base clock signal. Moreover, the method includes a step of decrypting the to-be-decrypted data to obtain the plain data.

BRIEF DESCRIPTION OF THE FIGURES

The following drawings are merely examples for illustrative purposes according to various disclosed embodiments and are not intended to limit the scope of the present invention.

DETAILED DESCRIPTION

The disclosure will now be described more specifically with reference to the following embodiments. It is to be noted that the following descriptions of some embodiments are presented herein for purpose of illustration and description only. It is not intended to be exhaustive or to be limited to the precise form disclosed.

Hardware data encryption usually used a clock signal for encrypting digital sequence. Typically, a circuit for data encryption uses a phase locked loop (PLL) clock signal generator to generate an encryption clock signal based on which to-be-encrypted plain data can be read and encrypted by the circuit for data encryption to obtain encrypted data. However, the encryption clock signal generated by the PLL clock signal generator is easy to be cracked, leading to a poor security for the encrypted data.

Figure 1:
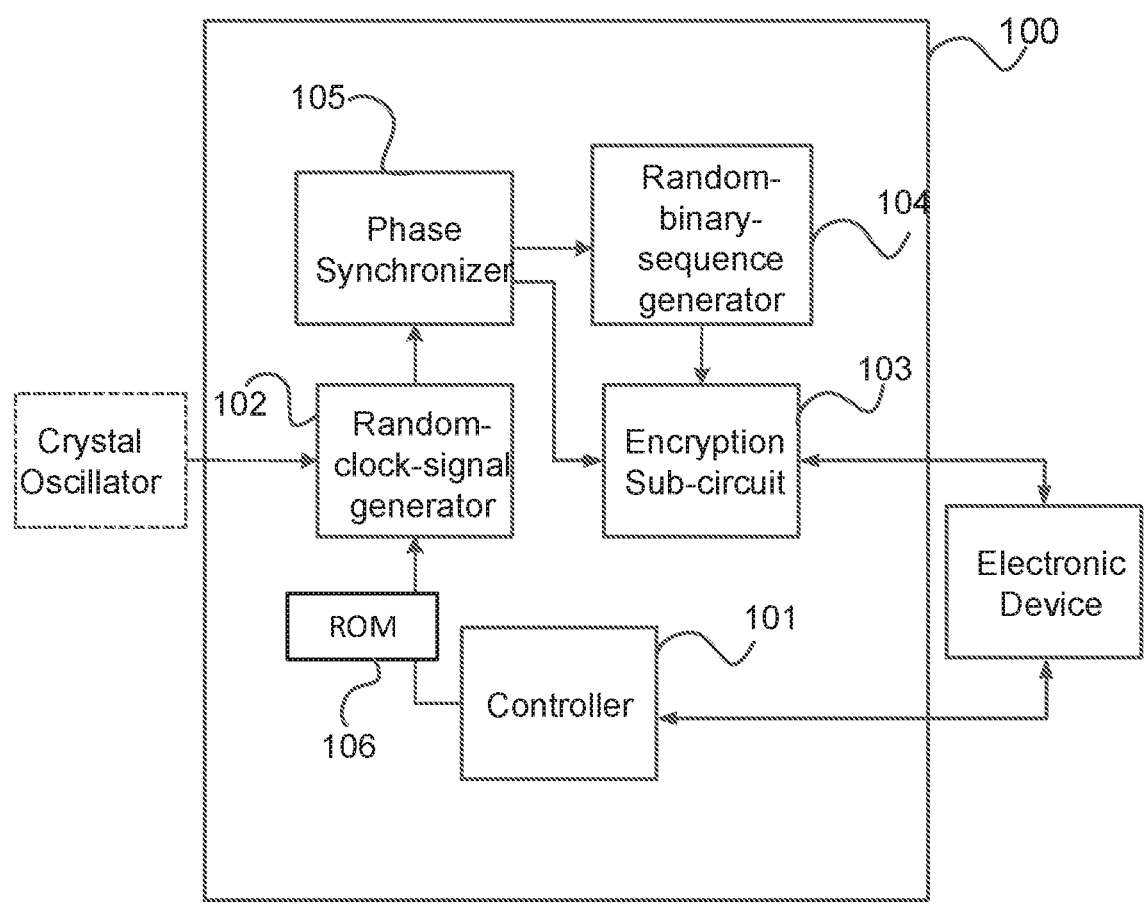
FIG. 1 is a block diagram of a circuit for data encryption according to some embodiments of the present disclosure.

Accordingly, the present disclosure provides, inter alia, a circuit for data encryption and/or data decryption, an apparatus having the same, and methods thereof that substantially obviate one or more of the problems due to limitations and disadvantages of relative poor security the related art using hardware for data encryption. In one aspect, a circuit of data encryption is provided according to some embodiments of the present disclosure. Referring to FIG. 1, a block diagram of the circuit of data encryption 100 is shown with major components including at least a controller 101, a random-clock-signal generator 102, an encryption sub-circuit 103.

In an embodiment, the controller 101 is configured to receive an encryption command (from an electronic device that needs to encrypt its storage device or data stored therein) and to randomly generate a frequency parameter in response to the encryption command. The frequency parameter defines different frequencies over different timeframes and is sent from the controller 101 to the random-clock-signal generator 102. Optionally, the frequency parameter includes a group of frequencies $f_k$ associated with a group of numbers $n_k$. Here, k is a serial number varying from 1 to m. $n_k$ represents number of cycles of the frequency $f_k$ (a length in time) lasted in a respective one of multiple different timeframes. In other words, the timeframe has a length of time $n_k/f_k$. Optionally, $n_k$ is selected from any integers. Optionally, $n_k$ is greater than 2. Optionally, the frequency parameter is generated using a symmetric-encrypted-key generation algorithm executed in the controller 101. Optionally, the encryption-key generation algorithm used by the controller includes Data Encryption Standard (DES) algorithm or International Data Encryption Algorithm (IDEA). The controller 101 is also called an encryption controller.

In the embodiment, the random-clock-signal generator 102 is configured to generate an encryption clock signal based on a base clock signal and the frequency parameter and send the encryption clock signal to the encryption sub-circuit 103. The encryption clock signal is comprised of multiple different clock frequencies over respective multiple different timeframes. In particular, a respective one of multiple different clock frequencies is an integer multiplication of a base clock frequency of the base clock signal. Optionally, integer multiplication number is a random integer number associated with the frequency parameter. Optionally, a length of the respective one timeframe, during which a particular clock frequency lasts, includes a number of cycles of the particular frequency that is also associated with the frequency parameter.

In the embodiment, the encryption sub-circuit 103 is configured to receive the encryption clock signal and to receive (to-be-encrypted) plain data based on effective edges of the encryption clock signal. The effective edges of the encryption clock signal are either rising edges or falling edges of respective signal pulses of the encryption clock signal. By reading via the effective edges, the plain data is sampled effectively via an encryption key and then encrypted according to a symmetric encryption algorithm to obtain encrypted data.

Optionally, the circuit of data encryption 100 is coupled with an external electronic device via a communication interface. Optionally, the communication interface is selected from one of a graphical user interface and a command-line interface or one of data-communication interfaces including Universal Serial Bus (UBS), peripheral component interconnect express (PCIE), and Serial Advanced Technology Attachment (SATA). The external electronic device also serves as a host to send an encryption command via the communication interface to the controller 101 and to send plain data stored in a storage device of the host to the encryption sub-circuit 103. The encryption sub-circuit 103 performs its encryption function to the plain data to obtain encrypted data. The encrypted data also is sent via the communication interface to the host. Optionally, the host or external electronic device can be one of computer, server, or cloud-computing equipment that have storage devices.

Referring to FIG. 1, the circuit of data encryption 100 also is configured to couple with a crystal oscillator connected with the random-clock-signal generator 102. The crystal oscillator is configured to output a pre-set clock signal when it is applied with a proper bias voltage. The clock signal is sent as an input clock signal to the random-clock-signal generator 102. The random-clock-signal generator 102 is configured, in an embodiment, to generate a base clock signal based on the input clock signal. Optionally, the crystal oscillator is part of the circuit of data encryption 100.

Optionally, the frequency parameter generated by the controller 101 includes multiple different frequencies and multiple timeframes respectively corresponding to the multiple different frequencies. For example, the frequency parameter includes three frequencies including 10 MHz, 20 MHz, and 30 MHz. Respectively, the three timeframes are 10 sec., 15 sec., and 20 sec. In this example, the random-clock-signal generator 102 is configured to generate a periodic base clock signal with a base clock frequency of 10 MHz based on the input clock signal received from the crystal oscillator. Further, the random-clock-signal generator 102 is configured to generate an encryption clock signal based on the base clock signal and the frequency parameter. The encryption clock signal is a synthesized clock signal including a 10 MHz frequency lasting first 15 sec, followed by a 20 MHz frequency lasting 10 sec., and lastly a 30 MHz frequency lasting 15 sec.

Figure 2:
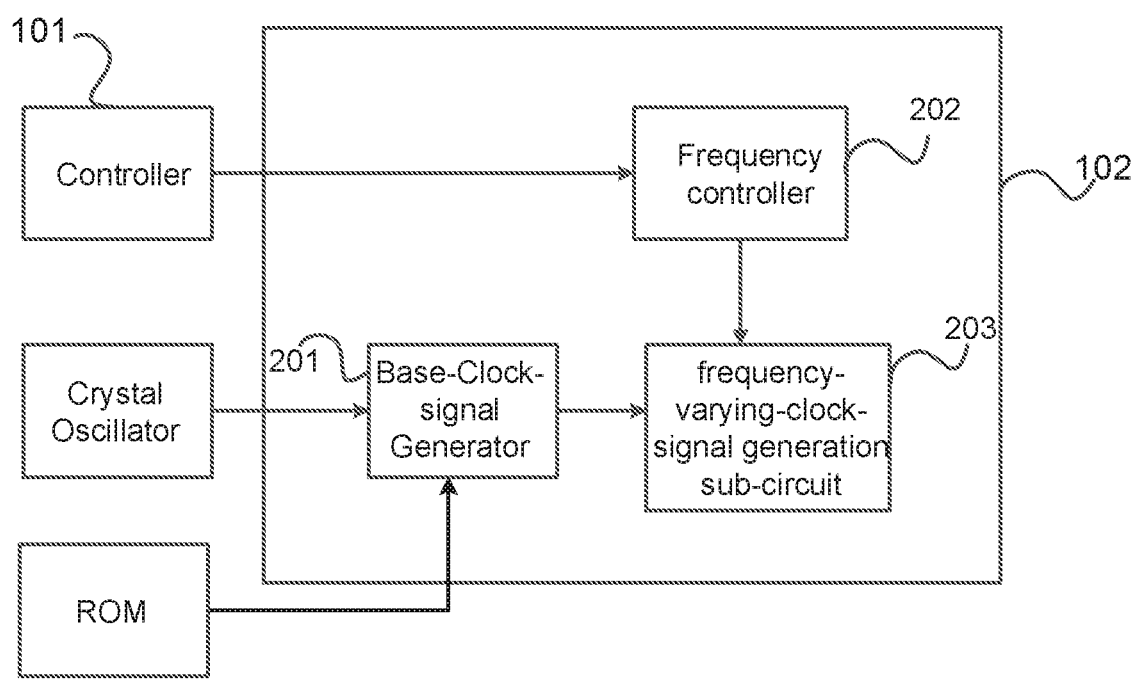
FIG. 2 a block diagram of a random-clock-signal generator according to an embodiment of the present disclosure.

FIG. 2 a block diagram of a random-clock-signal generator according to an embodiment of the present disclosure. Referring to FIG. 2, the random-clock-signal generator 102 (see FIG. 1) includes a base-clock-signal generator 201 coupled to the crystal oscillator (mentioned earlier) and configured to generate a base clock signal based on an input clock signal provided from the crystal oscillator. The random-clock-signal generator 102 also includes a frequency controller 202 coupled to the (encryption) controller 101 and configured to receive the frequency parameter from the controller 101. Additionally, the random-clock-signal generator 102 includes a frequency-varying-clock-signal generator sub-circuit 203 coupled to the base-clock-signal generator 201 and the frequency controller 202. The frequency-varying-clock-signal generator sub-circuit 203 is configured to generate the encryption clock signal based on the base clock signal from the base-clock-signal generator 201 derived from the input clock signal and the frequency parameter delivered via the frequency controller 202.

In an embodiment, the base-clock-signal generator 201 receives an input clock signal generated by a crystal oscillator (driven by applying a proper bias voltage). The input clock signal has a preset input clock frequency and cycle period. Based on the input clock frequency and cycle period, a base clock signal can be generated by the base-clock-signal generator 201 as a periodic clock signal having a base clock frequency equal to an integer multiplication of the input clock frequency.

In another embodiment, the base-clock-signal generator 201 receives an input clock signal generated by a crystal oscillator (driven by applying a proper bias voltage). Based on the input clock signal, the base-clock-signal generator 201 is configured to generate at least two first clock signals sequentially in time. Based on time sequence of these first clock signals, a timespan between two effective edges of two subsequent first clock signals can be determined. For example, a signal pulse of a first clock signal has a rising edge appeared at time t1 and a signal pulse of a subsequent first clock signal has a rising edge appeared at a later time t2. The timespan of the two rising edges is t2−t1. Based on this timespan, a base clock signal is generated such that the base clock frequency is an integer multiplication of the timespan. In an alternative embodiment, the timespan between two subsequent first clock signals generated by the base-clock-signal generator 201 is set to be equal to a base-time unit $T_A$, which can be a basic constant stored in a memory device associated with the circuit of data encryption 100 and read by the base-clock-signal generator 201.

Once the base-clock-signal generator 201 generates the base clock signal, it also is configured to send the base clock signal with a base clock frequency to the frequency-varying-clock-signal generation sub-circuit 203. The frequency-varying-clock-signal generation sub-circuit 203 further is configured to generate a synthesized clock signal based on the newly generated base clock signal and the frequency parameter delivered from the frequency controller 203. The frequency parameter was generated randomly by the (encryption) controller 101 in response to the encryption command. The synthesized clock signal is comprised of a random combination of different clock frequencies respectively over multiple different timeframes with a respective one of the different clock frequencies being limited to an integer division of the base clock frequency and the corresponding timeframe being limited to n numbers of cycles of the base clock signal, n being an integer greater than 2.

Figure 3:
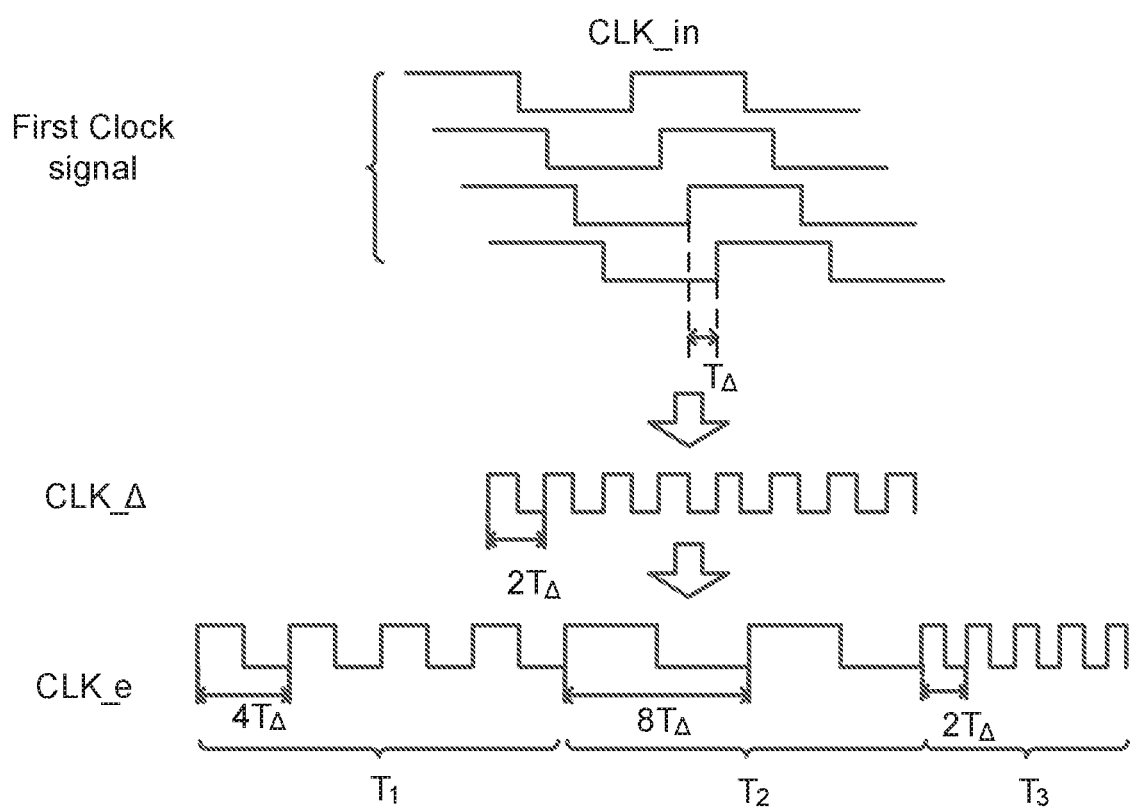
FIG. 3 is a schematic diagram illustrating an encryption clock signal being generated by a random-clock-signal generator based on time-average-frequency direct-period synthesis (TAF-DPS) according to an embodiment of the present disclosure.

For example, as shown in FIG. 3, the base-clock-signal generator 201 generates 4 first clock signals based on the input clock signal. According to time sequence of these first clock signals being generated, a timespan between two effective edges of two subsequent first clock signals is determined to be $T_A$. If $2T_A$ is set to one cycle period of a periodic signal, this periodic signal is generated as the base clock signal CLK_Δ with a base clock frequency of $1/(2T_A)$. Referring to FIG. 3, in the example the frequency controller 203 receives a frequency parameter including a combination of three frequencies over three different timeframes. In an alternative view, the three frequencies correspond respectively to three cycle periods of $4T_A$, $8T_A$, and $2T_A$. A first frequency having the cycle period of $4T_A$ corresponds to a first timeframe of $T_1$. A second frequency having the cycle period of $8T_A$ corresponds to a second timeframe of $T_2$. A third frequency having the cycle period of $2T_A$ corresponds to a first timeframe of $T_3$. Based on both the base clock signal CLK_Δ with the base clock frequency of $1/(2T_A)$ and the frequency parameter, an encryption clock signal CLK_e is synthesized as a combination of the first frequency in the first timeframe, the second frequency in the second timeframe, and the third frequency in the third timeframe. Here, in the example, each of the first frequency, the second frequency, and third frequency is an integer division (1/2, 1/4, 1/1) of the base clock frequency of $1/(2T_A)$. Further, referring to the example shown in FIG. 3, the first timeframe T1 includes 4 cycle periods of the first frequency; the second timeframe T2 includes 2 cycle periods of the second frequency; and the third timeframe includes 5 cycle periods of the third frequency.

Optionally, many types of clock signal generators can be employed to generate a variable-frequency clock signal that has different frequency-switching speed, resources-consumption, clock-accuracy, and tunable bandwidth based on selections of frequency-varying-clock-signal generation sub-circuits for achieving different requirements in actual applications. In the embodiment shown in FIG. 2 and FIG. 3, the random-clock-signal generator 102 is selected to be a time-average-frequency direct-period-synthesis (TAF_DPS) clock-signal generator. The advantages of the TAF-DPS clock-signal generator includes fast frequency-switching speed, low resources-consumption, and high clock-accuracy and tunable bandwidth for the clock signals generated thereof.

Optionally, in the embodiment of the TAF-DPS clock-signal generator is used in the random-clock-signal generator 102, a certain time delay is needed for one clock frequency being switched to one next clock frequency due to functional limitation of hardware electronic circuit. In order to ensure that the TAF-DPS clock-signal generator successfully makes the frequency switch, a sufficient time of N number of cycle periods is preserved on top of any number of cycle periods lasted for corresponding clock frequency. Optionally, N is an integer no smaller than 1.

Referring to FIG. 1 again, the encryption sub-circuit 103 receives the encryption clock signal from the random-clock-signal generator 102 and is configured to receive plain data stored in an external electronic device for encryption based on effective edges of signal pulses of the encryption clock signal. In other words, the encryption clock signal is employed for sampling out the to-be-encrypted data from the plain data. The effective edges include either rising edges or falling edges of each and every signal pulses of the encryption clock signal with varying frequencies in different timeframes. Once the to-be-encrypted data is determined, the encryption sub-circuit 103 is configured to perform an encryption operation using one of preset encryption algorithm to obtain encrypted data. Optionally, the preset encryption algorithm includes any symmetric encryption algorithm including DES encryption algorithm.

Figure 4:
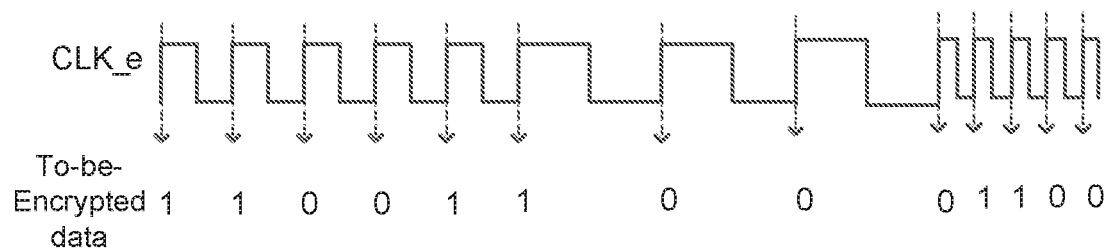
FIG. 4 is a schematic diagram illustrating an encryption sub-circuit receiving a to-be-encrypted plain data according to an embodiment of the present disclosure.

As an example, FIG. 4 shows a schematic diagram illustrating an encryption sub-circuit receiving a to-be-encrypted plain data according to an embodiment of the present disclosure. The effective edges of the encryption clock signal CLK_e are rising edges of those signal pulses (FIG. 4). To-be-encrypted data includes a binary sequence of 1100110001100. The encryption sub-circuit 103 receives the to-be-encrypted data sampled by the rising edges of the encryption clock signal CLK_e. The encryption sub-circuit 103 performs encryption operation to the to-be-encrypted data 1100110001100 to obtain a piece of non-readable codes (not shown), which is then the encrypted data obtained.

In the embodiment, the circuit of data encryption 100 is configured to randomly generate a frequency parameter via the controller 101. The random-clock-signal generator 102 generates an encryption clock signal having variable frequencies in different timeframes based on the randomly generated frequency parameter. The encryption sub-circuit 103 then receives plain data based on the encryption clock signal having variable frequencies in different timeframes to determine to-be-encrypted data, and encrypt the to-be-encrypted data to obtain encrypted data. Since the encryption clock signal has variable different frequencies in different timeframes with different number of cycle periods thereof, the frequency of the encryption clock signal is highly uncertain at any time point. This substantially enhances randomness and security of the encryption clock signal, providing securer encryption of data.

Referring to FIG. 1, the circuit of data encryption further includes a random-binary-sequence generator 104 coupled to the encryption sub-circuit 103. The random-clock-signal generator 102 also is configured to send the base clock signal generated thereof to the random-binary-sequence generator 104 for the latter to generate a random binary sequence. The random binary sequence is sent from the random-binary-sequence generator 104 to the encryption sub-circuit 103. The encryption sub-circuit 103 also is configured to combine the to-be-encrypted data with the random binary sequence to obtain a combined binary sequence. The encryption sub-circuit 103 then performs encryption operation to the combined binary sequence to obtain the encrypted data.

Figure 5:
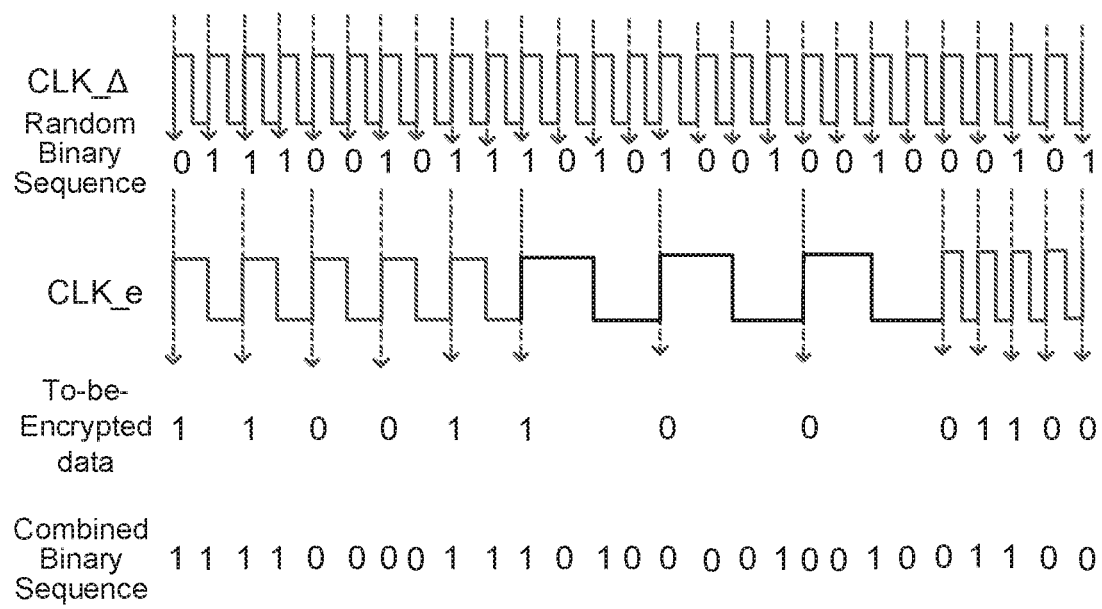
FIG. 5 is a schematic diagram illustrating a circuit for data encryption obtaining encrypted data according to an embodiment of the present disclosure.

In an example, as shown in FIG. 5, a base clock signal CLK_Δ is generated by the random-clock-signal generator and is sent to the random-binary-sequence generator. Then, the random-binary-sequence generator is configured to generate a random binary sequence of 0111001011101010010010000101 based on rising edges of the base clock signal CLK_Δ. This random binary sequence is sent to the encryption sub-circuit. Referring to FIG. 5, a binary sequence of to-be-decrypted plain data received by the encryption sub-circuit based on rising edges of the encryption clock signal (sent from the random-clock-signal generator) is 1100110001100. The encryption sub-circuit determines a respective one of first data in the random binary sequence that is aligned with a respective one of rising edges of signal pulses of the encryption clock signal CLK_e. The encryption sub-circuit further determines a respective one of second data in the to-be-encrypted data that is corresponded to the respective one of first data in the random binary sequence based on the encryption clock signal. Then, the respective one of first data in the random binary sequence is replaced by the corresponding one of second data to obtain a combined binary sequence of 1111000011101000001001000. The encryption sub-circuit additionally performs an encryption operation to the combined binary sequence using a preset encryption algorithm to obtain the encrypted data (i.e., an encrypted binary sequence). In this embodiment, using a combination of a random binary sequence with to-be-encrypted data to add interference term into the sampled to-be-encrypted data during the encryption operation makes the security of the data encryption even higher.

Referring to FIG. 1 again, the circuit of data encryption 100 furthermore includes a phase synchronizer 105 coupled respectively to the random-clock-signal generator 102, the random-binary-sequence generator 104, as well as directly to the encryption sub-circuit 103. In an embodiment, the random-clock-signal generator 102 is configured to send the base clock signal and the encryption clock signal to the phase synchronizer 105. The phase synchronizer 105 is configured to receive both the base clock signal and the encryption clock signal and to synchronize the base clock signal with the encryption clock signal in phase. In specific embodiments, a respective one of rising or falling edges of the encryption clock signal is aligned positively with a respective one of some rising or falling edges of the base clock signal. Since any respective one clock frequency of the encryption clock signal in any of different timeframes is configured to be an integer division of the base clock frequency of the base clock signal, the synchronization between the encryption clock signal and the base clock signal can be readily achieved. The phase synchronizer 105 is further configured to send the base clock signal that is synchronized in phase with the encryption clock signal to the random-binary-sequence generator 104. The phase synchronizer 105 is further configured to send the encryption clock signal that is synchronized in phase with the base clock signal to the encryption sub-circuit 103.

Optionally, the circuit of data encryption 100 includes a read-only memory (ROM) 106 configured to save a base-time unit ($T_A$) as a smallest time unit to be employed in the circuit (see FIG. 1). Optionally, the base-time unit $T_A$ is read by a base-clock-signal generator 201 in the random-clock-signal generator 102 (see FIG. 2) and used to generate a base clock signal. Optionally, the read-only memory (ROM) 106 is configured to download the frequency parameter generated randomly by the encryption controller 101. Optionally, the random-clock-signal generator 102 is configured to read the frequency parameter generated by the encryption controller 101 in response to an encryption command received from a host or an electronic device that has a storage device subjected to be encrypted or has data stored in the storage device subjected for encryption.

In some embodiments of the present disclosure, the circuit of data encryption uses a phase synchronizer to perform a phase synchronization to synchronize a base clock signal and an encryption clock signal both generated by a random-clock-signal generator. The phase synchronization allows the phase of the vase clock signal be aligned with the phase of the encryption clock signal. For example, a rising or falling edge of the base clock signal is aligned in phase with a rising or falling edge of the encryption clock signal. Therefore, the random-binary-sequence generator and the encryption sub-circuit in the circuit of data encryption can be synchronized in operation, enhancing stability of the encryption by the circuit of data encryption.

Figure 6:
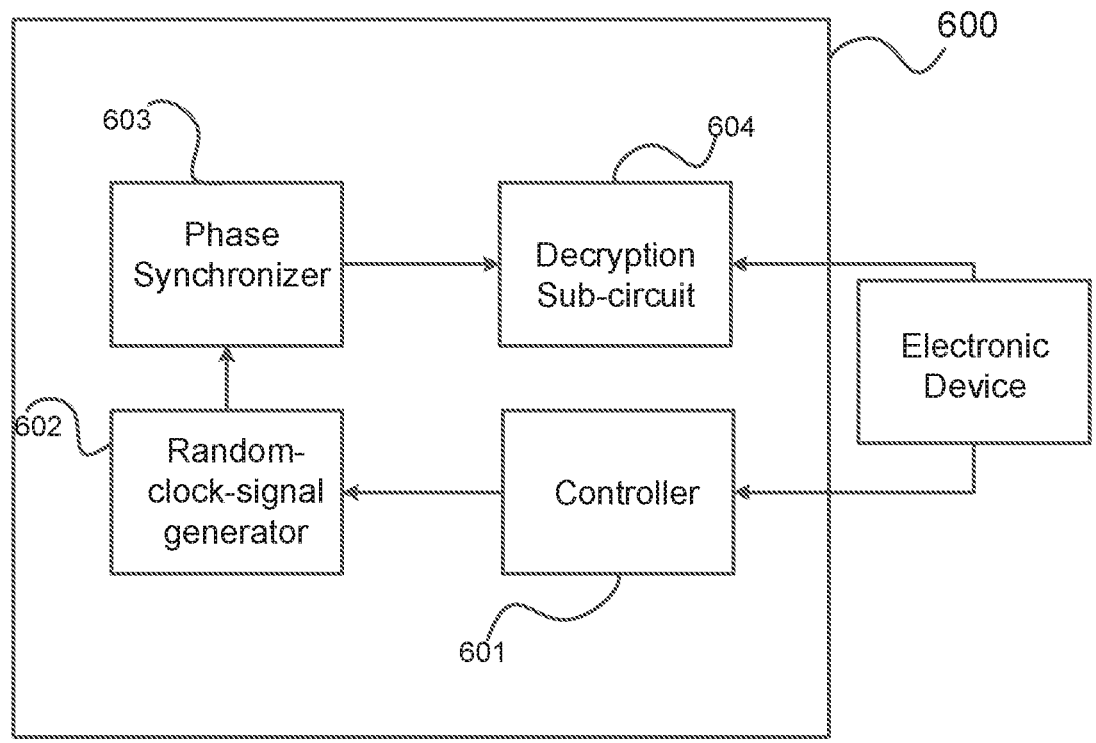
FIG. 6 is a block diagram of a circuit for data decryption according to some embodiments of the present disclosure.

In an alternative aspect, the present disclosure provides a circuit of data decryption that is configured to symmetrically decrypt an encrypted data to obtain plain data that was originally received for data encryption. FIG. 6 shows a block diagram of a circuit for data decryption according to some embodiments of the present disclosure. Referring to FIG. 6, the circuit of data decryption 600 includes a decryption controller 601, a random-clock-signal generator 602, a phase synchronizer 603, and a decryption sub-circuit 604. The decryption controller 601 is configured to obtain a frequency parameter associated with an encryption clock signal based on a decryption command, the frequency parameter defining different timeframes corresponding to different frequencies and is configured to send the frequency parameter to the random-clock-signal generator 602. In particular, the frequency parameter is obtained in response to the decryption command by reading it from the ROM associated with a circuit of data encryption 100 (see FIG. 1) where the frequency parameter is originally generated by an encryption controller in response to an encryption command and downloaded into the ROM. Optionally, the decryption controller 601 and the encryption controller 101 are formed as a unitary controller, e.g., a unitary controller that responds to both the encryption command and decryption command. Optionally, the unitary controller is shared with both the circuit of data encryption 100 as an encryption controller to generate randomly a frequency parameter for generating an encryption clock signal for data encryption and the circuit of data decryption 600 as a decryption controller to retrieve the same frequency parameter used for generating a decryption clock signal for data decryption. The random-clock-signal generator 602 is configured to generate a decryption clock signal based on the frequency parameter obtained and based on a base clock signal. The base clock signal is also generated by the random-clock-signal generator 602 based on the base-time unit saved in the same ROM.

In a specific embodiment, the random-clock-signal generator 602 is configured to receive the frequency parameter and to generate a synthesized clock signal based on the base clock signal. The synthesized clock signal is a decryption clock signal comprising a combination of different clock frequencies respectively over multiple different timeframes. Optionally, the random-clock-signal generator 602 and the random-clock-signal generator 102 are formed as a unitary clock-signal generator. Optionally, the random-clock-signal generator 602 is configured to be a time-average-frequency direct-period synthesis clock-signal generator driven by the same base clock signal and the same frequency parameter. Optionally, the decryption clock signal is substantially a combination of different clock frequencies lasted over different timeframes, wherein any one clock frequency in any timeframe is set to be an integer division of the base clock frequency of the base clock signal and the length of the respective timeframe is set to be an integer multiplication of cycle periods corresponding to the clock frequency. Optionally, the integer multiplication is greater than 2.

In the embodiment, the phase synchronizer 603 is configured to synchronize the base clock signal and the decryption clock signal to make the phase of the base clock signal be aligned positively with the phase of the decryption clock signal. The phase synchronizer 603 is also configured to send both the base clock signal and the decryption clock signal synchronized in phase to the decryption sub-circuit 604. The decryption sub-circuit 604 is configured to receive encrypted data based on respective effective edges of the base clock signal. The received encrypted data is sampled based on effective rising or falling edges of the decryption clock signal that are synchronized in phase with some of the effective rising or falling edges of the base clock signal to determine to-be-decrypted data. Since any respective one clock frequency of the decryption clock signal in any of different timeframes is configured to be an integer division of the base clock frequency of the base clock signal, the synchronization between the decryption clock signal and the base clock signal can be readily achieved. Furthermore, the decryption sub-circuit 604 is configured to decrypt the to-be-decrypted data to obtain plain data.

Optionally, the decryption sub-circuit 604 receives the encrypted data based on effective edges of base clock signal that does not contain a random binary sequence when it is originally generated. Then, the decryption sub-circuit 604 is directly to decrypt the encrypted data based on a preset decryption algorithm to obtain plain data.

Optionally, the decryption sub-circuit 604 receives the encrypted data based on effective edges of base clock signal that contains a random binary sequence when it is originally generated. Then, the decryption sub-circuit 604 is configured to determine respective data corresponding to effective edges of the decryption clock signal and further to decrypt the data based on a preset decryption algorithm to obtain plain data.

Figure 7:
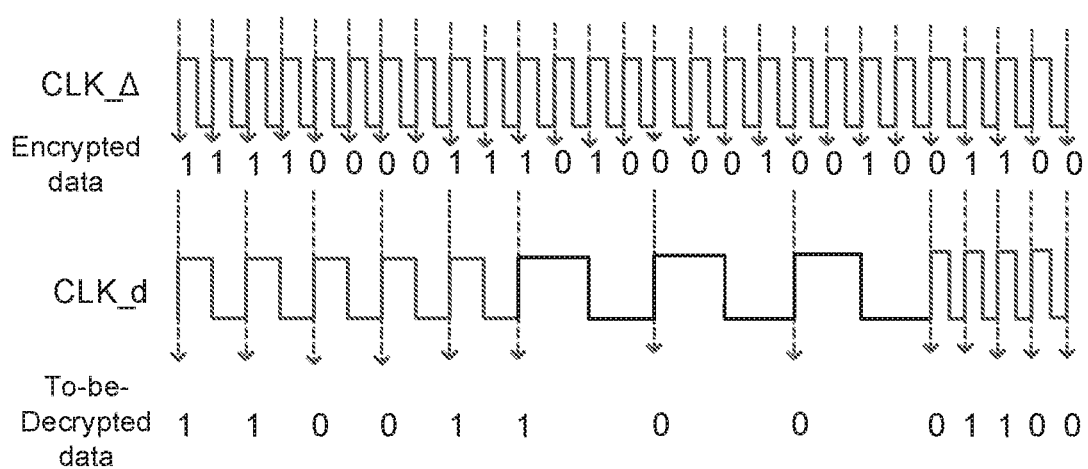
FIG. 7 is a schematic diagram illustrating a circuit for data decryption obtaining plain data after decryption according to an embodiment of the present disclosure.

For example, as shown in FIG. 7, the encrypted data received by the decryption sub-circuit based on rising edges of signal pulses of the base clock signal includes a first binary sequence of 1111000011101000010010100. Then, based on rising edges of signal pulses of the decryption clock signal, a second binary sequence is sampled out of the first binary sequence that corresponds to respective decryption clock signal can be determined to be 1100110001100. Additionally, the decryption sub-circuit 604 is configured to perform a decryption operation on the second binary sequence of 1100110001100 to obtain the (original) plain data (in a binary sequence).

Optionally, the phase synchronizer 603 is configured to synchronize the base clock signal with the decryption clock signal so that the phase of the base clock signal becomes aligned positively with the phase of the decryption clock signal. In other words, a respective one of rising or falling edges of the decryption clock signal is aligned with a respective one of some rising or falling edges of the base clock signal. Thus, after the encrypted data is received by the decryption sub-circuit via alignments with the respective effective edges of the base clock signal, sampling of the encrypted data corresponding to the effective edges of the decryption clock signal can be made based on the decryption clock signal. Further, the sampled data can be decrypted to obtain plain data. If the phase of the base clock signal is not aligned with the phase of the decryption clock signal, the sampled encrypted data via the decryption clock signal may be different from the original encrypted data, resulting a possible failure of data decryption.

Figure 8:
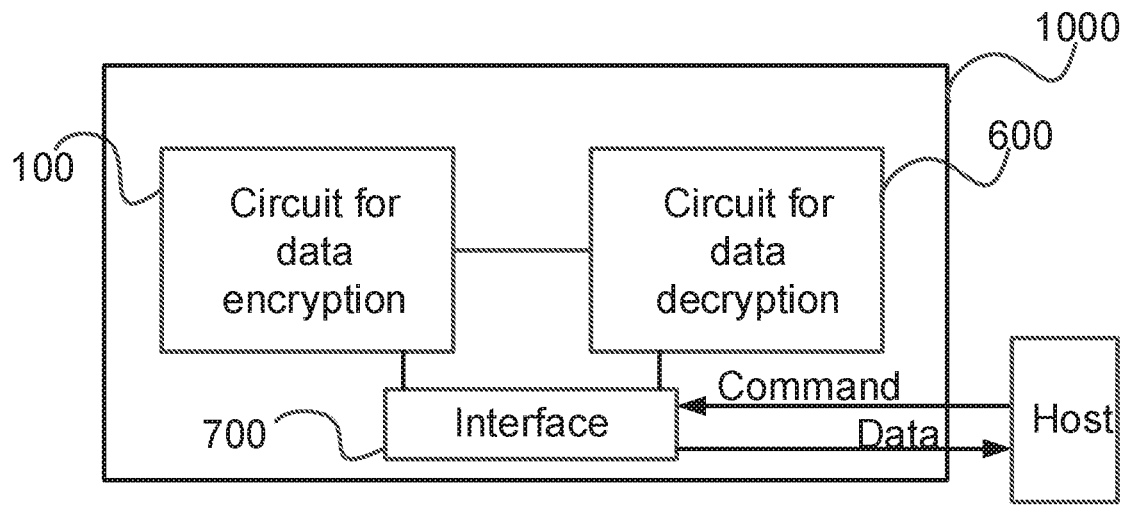
FIG. 8 is a block diagram of an apparatus for data encryption and decryption according to some embodiments of the present disclosure.

In yet another aspect, the present disclosure provides an apparatus for data encryption and data decryption. FIG. 8 shows a block diagram of an apparatus for data encryption and decryption according to some embodiments of the present disclosure. Referring to FIG. 8, the apparatus 1000 for data encryption and data decryption includes an integration of a circuit of data encryption and a circuit of decryption. Optionally, the circuit of data encryption 100 is substantially the same as the circuit 100 shown in FIG. 1 and the circuit of data decryption 600 is substantially the same as the circuit 600 shown in FIG. 6. Optionally, one controller is shared with both the circuit of data encryption 100 as an encryption controller and the circuit of data decryption 600 as a decryption controller for generating a same frequency parameter used for both data encryption and data decryption. Optionally, one random-clock-signal generator is shared with both circuit 100 and circuit 600 for generating a corresponding synthesized clock signal used either as an encryption clock signal and a decryption clock signal.

In an embodiment, referring FIG. 8 as well as FIG. 1 and FIG. 6, the apparatus 1000 includes a read-only memory 106 storing a base-time unit. The apparatus 1000 also includes a controller 101 (or 601), The controller is configured to receive an encryption command to randomly generate a frequency parameter defining different timeframes corresponding to different frequencies saved in the read-only memory 106. The controller is also configured to receive a decryption command to retrieve the frequency parameter from the read-only memory 106. Additionally, the apparatus 1000 includes a random-clock-signal generator 102 (or 602) configured to generate a synthesized clock signal based on the frequency parameter received from the controller and a base clock signal derived from the base-time unit. The synthesized clock signal includes a combination of different clock frequencies respectively over multiple different timeframes. Each clock frequency is set to be an integer division of a base clock frequency determined by the base-time unit. Each timeframe has a length of time equal to an integer multiplication of a cycle period associated with the corresponding clock frequency.

In the embodiment, the apparatus 1000 further includes a phase synchronizer 105 (or 603) configured to synchronize the synthesized clock signal in phase with the base clock signal. Furthermore, the apparatus 1000 includes an encryption sub-circuit 103 configured to receive plain data. The encryption sub-circuit 103 is configured to perform a sampling replacement to determine to-be-encrypted data based on effective rising or falling edges of the synthesized clock signal. The encryption sub-circuit 103 further is configured to encrypt the to-be-encrypted data to obtain the encrypted data. The apparatus 1000 further includes a decryption sub-circuit 604 configured to receive the encrypted data based on effective rising or falling edges of the base clock signal. The decryption sub-circuit 604 is configured to determine to-be-decrypted data based effective rising or falling edges of the synthesized clock signal synchronized in phase with some of the effective rising or falling edges of the base clock signal. The decryption sub-circuit 604 also is configured to decrypt the to-be-decrypted data to obtain plain data.

In an embodiment, the apparatus 1000 is implemented as a plug-in cartridge configured in a (Field Programmable Gate Arrays) FPGA integrated circuit chip. Optionally, as shown in FIG. 8, the plug-in cartridge includes a communication interface 700 selected from one of a Universal Serial Bus (USB), a peripheral component interconnect express (PCIE), a mini serial AT attachment (mSATA) for communicating with a Host electronic device selected from one of a personal computer, a server computer, a mobile terminal, a cloud-computing system to receive the encryption command or the decryption command and to encrypt or decrypt a storage device therein and data stored in the storage device. Optionally, the storage device can be any one type of memory selected from a read-only memory (ROM), a random-access memory (RAM), a hard disc. Optionally, the encryption needed includes full-disc encryption, disc-partition encryption, data-file encryption.

Figure 9:
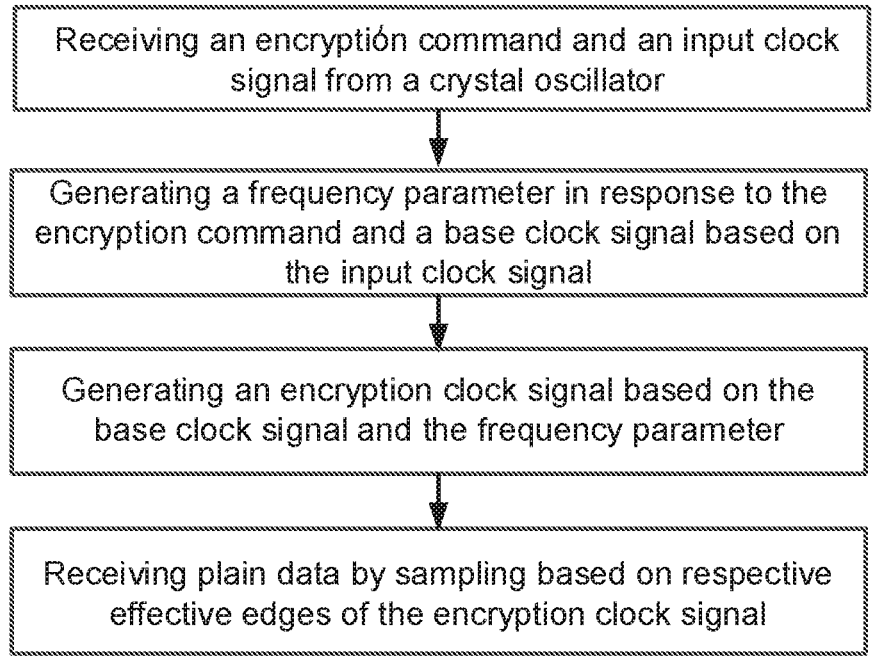
FIG. 9 is a flow chart of a method for data encryption according to an embodiment of the present disclosure.

In yet another aspect, the present disclosure provides a method for encrypting data and decrypting data using the apparatus described herein. FIG. 9 is a flow chart of a method for data encryption according to an embodiment of the present disclosure. Referring to FIG. 9, the method is formatted in programmable instructions embedded in a pluggable cartridge like the apparatus 1000 described herein and is executed when the apparatus is plugged in to any host electronic device based on a compatible communication interface. The method includes a step of receiving an encryption command by a controller and an input clock signal from a crystal oscillator to a base-clock-signal generator. Optionally, the encryption command is sent from a user via a user interface. Optionally, the encryption command is sent via a communication interface from a host electronic device once the apparatus 1000 is plugged in. The host electronic device has at least one storage device that needs encryption or the storage device stored data that needs to be encrypted. Optionally, the storage device of the host electronic device or the data stored in the storage device can be encrypted once it is plugged in with the apparatus 1000.

In the embodiment; the method further includes a step of generating a frequency parameter by the controller in response to the encryption command. The frequency parameter defining different timeframes corresponding to different frequencies. Optionally, the frequency parameter randomly generated by the controller for a purpose of a data encryption operation is downloaded into a memory device associated with the apparatus 1000. The step also includes generating a base clock signal by the base-clock-signal generator based on the input clock signal. Optionally, the base-clock-signal generator is part of a random-clock-signal generator. Optionally, the base clock signal is generated based on a base-time unit saved in the memory associated with the apparatus 1000.

In the embodiment, the method additionally includes a step of generating an encryption clock signal by the random-clock-signal generator based on the base clock signal and the frequency parameter. Optionally, the frequency parameter is read by the random-clock-signal generator from the memory where the frequency parameter generated by the controller is stored. The encryption clock signal is randomly generated as a combination of different clock frequencies over multiple different timeframes. Optionally, a respective one of the different clock frequencies is set to an integer division of a base clock frequency of the base clock signal and the respective one timeframe lasts a length in time being an integer multiplication of a cycle period corresponding to the respective one of different clock frequencies.

In the embodiment, the method furthermore includes a step of receiving plain data by sampling based on respective effective edges of the encryption clock signal. The effective edges of the encryption clock signals include either rising edges or falling edges of multiple signal pulses appeared within each timeframe. Optionally, the method further includes a step shown in FIG. 11 of synchronizing the encryption clock signal and the base clock signal by a phase synchronizer to make the effective edges of the encryption clock signal be aligned in phase with some effective edges of the base clock signal. Optionally, the phase synchronizer is part of the apparatus 1000 for data encryption and decryption.

In the embodiment, the step of generating a base clock signal based on the input clock signal specifically includes generating at least two first clock signals by the base-clock-signal generator based on the input clock signal. The step further includes determining a timespan between two effective edges of two subsequently generated first clock signals based on generation time sequence. Additionally, the step includes setting the timespan equal to the base-time unit. Furthermore, the step includes generating a base clock signal with a clock frequency being an integer division of a base clock frequency defined by the base-time unit. Optionally, the base-time unit is a minimum time unit stored in a memory associated with the apparatus 1000.

Figure 10:
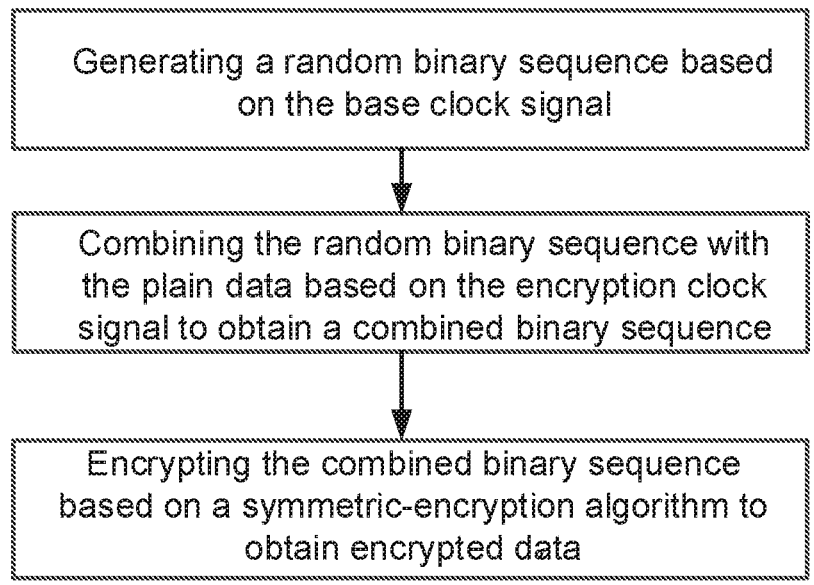
FIG. 10 is a flow chart of a method for data encryption according to an embodiment of the present disclosure.
Figure 11:
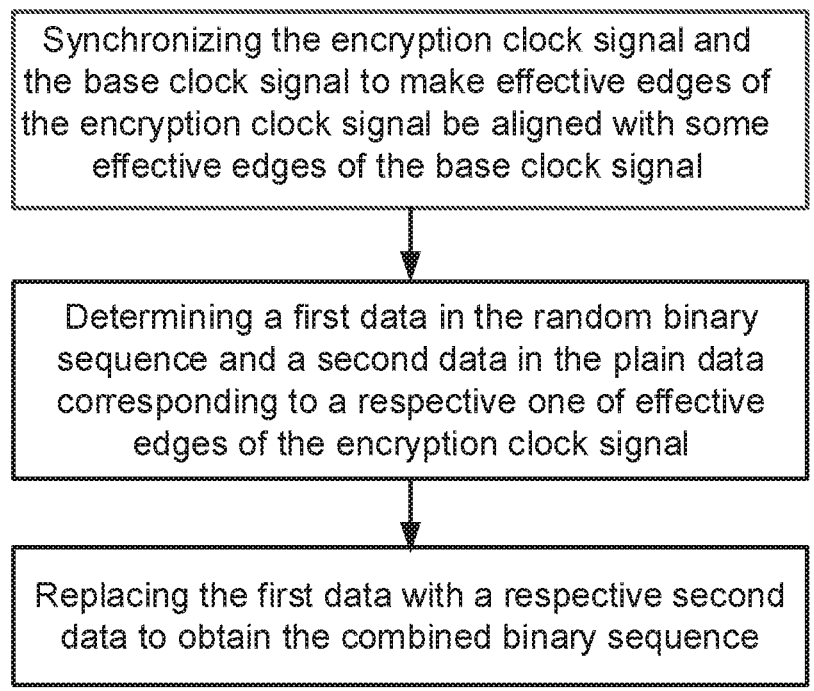
FIG. 11 is a flow chart of a method for data encryption according to an embodiment of the present disclosure.

The method for encrypting and decrypting data further includes more steps in a flow chart as shown in FIG. 10 according to the embodiment of the present disclosure. Referring to FIG. 10, the method includes a step of generating a random binary sequence by a random-binary-sequence generator based on the base clock signal. Optionally, the random-binary-sequence generator is part of the circuit of data encryption in the apparatus 1000. Additionally, the method includes a step of combining the random binary sequence with the plain data sampled based on the encryption clock signal to obtain a combined binary sequence. Optionally, the step of combining the random binary sequence with the plain data includes a sampling replacement operation, as shown in FIG. 11. Referring to FIG. 11, the step includes determining a first data in the random binary sequence and a second data in the plain data corresponding to a respective one of effective edges of the encryption clock signal and replacing the first data with a respective second data to obtain the combined binary sequence. Optionally, the step of combining the random binary sequence with the plain data is performed in an encryption sub-circuit in the apparatus 1000. Furthermore, the method includes a step of encrypting the combined binary sequence based on a symmetric-encryption algorithm to obtain encrypted data. Optionally, the encryption sub-circuit of the apparatus 1000 performs the encryption step.

Figure 12:
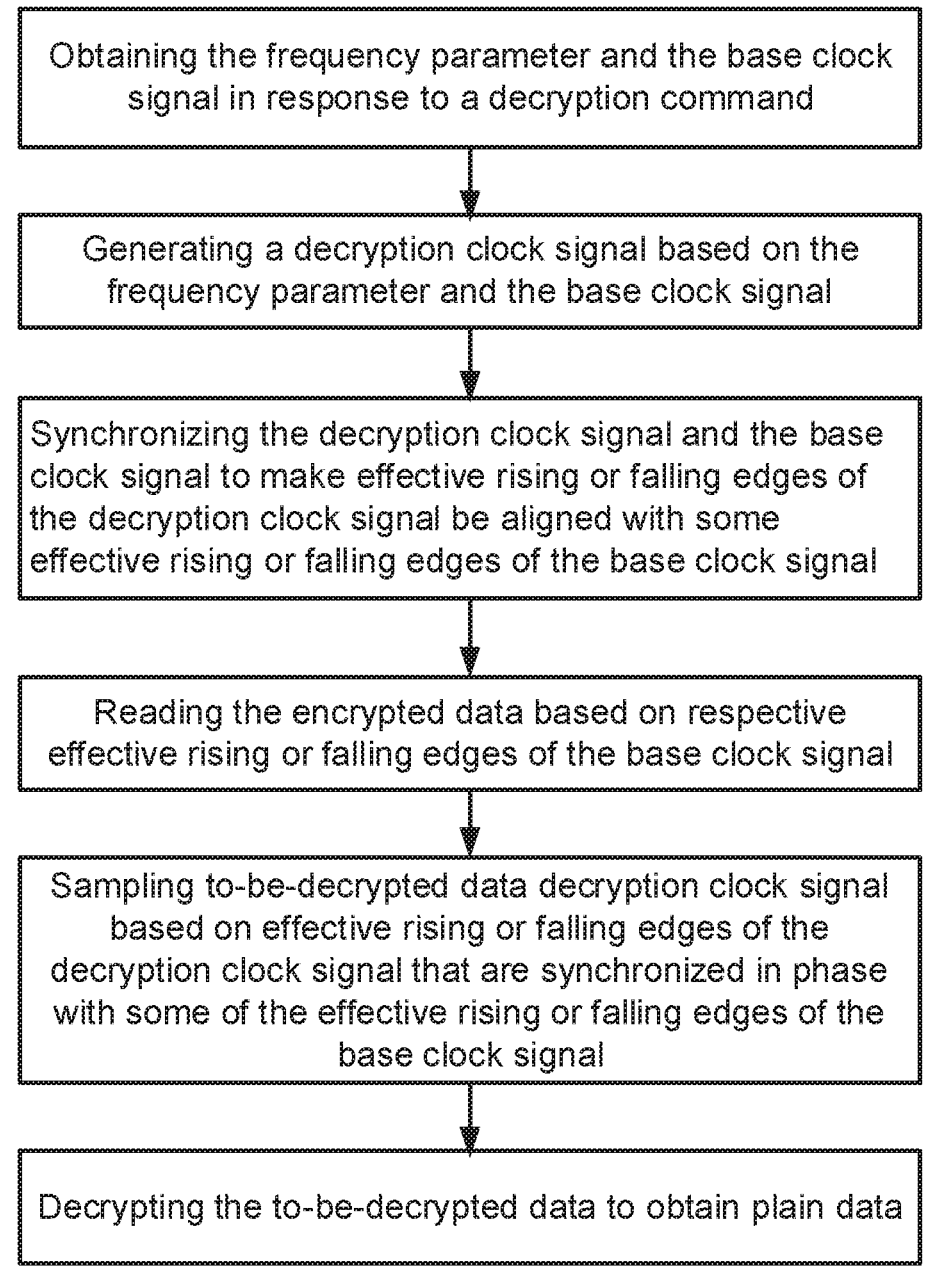
FIG. 12 is a flow chart of a method for data decryption according to an embodiment of the present disclosure.

The method for encrypting and decrypting data further includes more steps in a flow chart as shown in FIG. 12 according to the embodiment of the present disclosure. Referring to FIG. 12, the method includes a step of receiving a decryption command by a decryption controller in the apparatus 1000. Optionally, the decryption controller and the encryption controller are formed as a unitary controller. Optionally, the decryption command is sent from a user via a user interface. Optionally, the decryption command is sent via a communication interface from a host electronic device once the apparatus 1000 is plugged in. The host electronic device has at least one storage device that was encrypted or stored plain data that was encrypted through plugging the apparatus 1000 and the encrypted data needs to be decrypted to retrieve the original plain data.

In the embodiment, the method further includes a step of obtaining, in response to the decryption command, the frequency parameter and the base clock signal used for generating the encryption clock signal to obtain the encrypted data. Optionally, the frequency parameter is read out from the memory device associated with the apparatus 1000 where the frequency parameter randomly generated by the encryption controller has been pre-downloaded in. Optionally, the base clock signal is also the same one generated based on the base-time unit saved in the memory device associated with the apparatus 1000.

In the embodiment, the method additionally includes a step of generating a decryption clock signal by a random-clock-signal generator based on the frequency parameter and the base clock signal. Optionally, the random-clock-signal generator is a same one in the apparatus 1000 used for generating the encryption clock signal. The decryption clock signal is comprised of a combination of different clock frequencies being different integer divisions of a base clock frequency associated with the base clock signal over multiple different timeframes.

In the embodiment, the method further includes a step of synchronizing the decryption clock signal and the base clock signal to make effective rising or falling edges of the decryption clock signal be aligned in phase with some effective rising or falling edges of the base clock signal. Optionally, the step of synchronizing is performed by a phase synchronizer in the apparatus 1000. The method then includes a step of reading the encrypted data by a decryption sub-circuit in the apparatus 1000 based on respective effective rising or falling edges of the base clock signal.

In the embodiment, the method furthermore includes a step of sampling to-be-decrypted data decryption clock signal based on effective rising or falling edges of the decryption clock signal that are synchronized in phase with some of the effective rising or falling edges of the base clock signal. Then, the method includes a step of decrypting the to-be-decrypted data to obtain the plain data using a decryption algorithm that is symmetric to the encryption algorithm used for data encryption. Optionally, the step of sampling and the step of decrypting are performed in the decryption sub-circuit in the apparatus 1000. Optionally, the plain data obtained by the decryption sub-circuit is sent back to the host electronic device via a communication interface associated with the pluggable apparatus 1000.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A circuit for data encryption, comprising:
   an encryption controller configured to randomly generate a frequency parameter defining different timeframes corresponding to different frequencies;
   a random-clock-signal generator configured to receive the frequency parameter to synthesize an encryption clock signal based on a base clock signal, the encryption clock signal comprising a random combination of different clock frequencies respectively over multiple different timeframes;
   an encryption sub-circuit configured to receive plain data and to encrypt the plain data by a sampling replacement driven by the encryption clock signal to obtain encrypted data and
   a random-binary-sequence generator configured to receive the base clock signal to generate a random binary sequence;
   wherein the encryption sub-circuit is configured to:
   receive the random binary sequence from the random-binary-sequence generator to combine with the plain data to obtain a combined binary sequence;
   perform a respective one sampling replacement for data in the combined binary sequence corresponding to a respective one of effective edges of the encryption clock signal with different clock frequencies appeared respectively in multiple different timeframes to obtain the encrypted data;
   determine a respective one of first data in the random binary sequence that is aligned with a respective one of rising edges of signal pulses of the encryption clock signal;
   determine a respective one of second data in the to-be-encrypted data that is corresponded to the respective one of first data in the random binary sequence based on the encryption clock signal;
   replace the respective one of first data in the random binary sequence by the corresponding one of second data to obtain a combined binary sequence; and
   perform an encryption operation to the combined binary sequence using a preset encryption algorithm to obtain the encrypted data.

2. The circuit of claim 1, wherein the encryption controller is configured to receive an encryption command and to generate the frequency parameter based on the encryption command using an encryption-key-generation algorithm, wherein the frequency parameter comprises a group of frequencies fk and a group of numbers nk, wherein k is a serial number varying from 1 to m, nk represents number of cycle periods of the frequency fk lasted in a respective one of multiple different timeframes, and nk is selected from any integers greater than 2, wherein the encryption-key-generation algorithm is selected from one of symmetric-key algorithms, Data Encryption Standard (DES) encryption algorithm, International Data Encryption Algorithm (IDEA).

3. The circuit of claim 1, wherein the random-clock-signal generator comprises a base clock signal generator configured to receive an input clock signal having an input frequency from a crystal oscillator and to generate the base clock signal as a periodic signal with a base clock frequency equal to the input frequency multiplying a multiplication factor.

4. The circuit of claim 1, further comprising a read-only memory storing the frequency parameter generated by the encryption controller and a base-time unit $T_A$.

5. The circuit of claim 4, wherein the random-clock-signal generator comprises a base clock-signal generator configured to receive an input clock signal having an input frequency from a crystal oscillator, to generate two or more first clock signals having a relative time delay between effective edges of two subsequent first clock signals equal to the base-time unit $T_A$, and to generate the base clock signal as a periodic signal with a base clock period equal to $2T_A$ multiplying an integer factor.

6. The circuit of claim 5, wherein the random-clock-signal generator further comprises a frequency controller coupled to the encryption controller to receive the frequency parameter, and a frequency-varying clock-signal generation sub-circuit coupled to the frequency controller and the base clock-signal generator to generate the encryption clock signal based on the base clock signal and the frequency parameter, wherein the encryption clock signal comprises a random combination of multiple clock frequencies being limited as different integer divisions of the base clock frequency over respective timeframes being limited as different number of cycle periods equal to integer multiplications of the base-time unit $T_A$.

7. The circuit of claim 6, wherein the random-clock-signal generator is a time-averaged-frequency direct-period synthesis (TAF-DPS) clock-signal generator and a respective one of the multiple clock frequencies of the encryption clock signal lasts at least three cycle periods in a respective one of the multiple different timeframes.

8. The circuit of claim 1, wherein the effective edges of the encryption clock signal are either rising edges or falling edges of respective signal pulses with different clock frequencies appeared respectively in multiple different timeframes.

9. The circuit of claim 1, further comprising a phase synchronizer coupled to the random-clock-signal generator to receive the base clock signal and the encryption clock signal, to perform a phase synchronization, to send the base clock signal synchronized with the encryption clock signal to the random-binary- sequence generator, and to send the encryption clock signal synchronized in phase with the base clock signal to the encryption sub-circuit.

10. A circuit for data decryption comprising:
   a decryption controller configured to obtain a frequency parameter associated with an encryption clock signal based on a decryption command, the frequency parameter defining different timeframes corresponding to different frequencies;
   a random-clock-signal generator configured to receive the frequency parameter and to synthesize a decryption clock signal based on a base clock signal, the decryption clock signal comprising a combination of different clock frequencies respectively over multiple different timeframes;

a phase synchronizer configured to synchronize the base clock signal and the decryption clock signal; and a decryption sub-circuit configured to receive encrypted data based on respective effective edges of the base clock signal, to determine to-be-decrypted data based on effective rising or falling edges of the decryption clock signal that are synchronized in phase with some of the effective rising or falling edges of the base clock signal, and to decrypt the to-be-decrypted data to obtain plain data;

wherein the decryption controller is configured to read the frequency parameter from a read-only memory pre-downloaded from an encryption controller, wherein the frequency parameter is generated by the encryption controller and is used together with the base clock signal to generate the encryption clock signal for driving an encryption sub-circuit to produce the encrypted data from which the to-be-decrypted data is sampled;

the phase synchronizer is configured to synchronize the base clock signal with the decryption clock signal thereby aligning a respective one of rising or falling edges of the decryption clock signal with a respective one of some rising or falling edges of the base clock signal; and the decryption sub-circuit is configured to sample the encrypted data corresponding to the effective edges of the decryption clock signal based on the decryption clock signal.

11. An apparatus for data encryption and decryption comprising:

a read-only memory storing a base-time unit;

a controller configured to receive an encryption command to randomly generate a frequency parameter defining different timeframes corresponding to different frequencies saved in the read-only memory, and to receive a decryption command to retrieve the frequency parameter from the read-only memory;

a random-clock-signal generator configured to generate a synthesized clock signal based on the frequency parameter received from the controller and a base clock signal derived from the base-time unit, the synthesized clock signal comprising a combination of different clock frequencies respectively over multiple different timeframes;

a phase synchronizer configured to synchronize the synthesized clock signal in phase with the base clock signal;

an encryption sub-circuit configured to receive plain data, to perform a sampling replacement to determine to-be-encrypted data based on effective rising or falling edges of the synthesized clock signal, and to encrypt the to-be-encrypted data to obtain the encrypted data;

a decryption sub-circuit configured to receive the encrypted data based on effective rising or falling edges of the base clock signal, to determine to-be-decrypted data based effective rising or falling edges of the synthesized clock signal synchronized in phase with some of the effective rising or falling edges of the base clock signal, and to decrypt the to-be-decrypted data to obtain plain data; and a random-binary-sequence generator configured to receive the base clock signal to generate a random binary sequence;

wherein the encryption sub-circuit is configured to:

receive the random binary sequence from the random-binary-sequence generator to combine with the plain data to obtain a combined binary sequence;

perform a respective one sampling replacement for data in the combined binary sequence corresponding to a respective one of effective edges of the encryption clock signal with different clock frequencies appeared respectively in multiple different timeframes to obtain the encrypted data;

determine a respective one of first data in the random binary sequence that is aligned with a respective one of rising edges of signal pulses of the encryption clock signal;

determine a respective one of second data in the to-be-encrypted data that is corresponded to the respective one of first data in the random binary sequence based on the encryption clock signal;

replace the respective one of first data in the random binary sequence by the corresponding one of second data to obtain a combined binary sequence; and perform an encryption operation to the combined binary sequence using a preset encryption algorithm to obtain the encrypted data.

12. The apparatus of claim 11, is a plug-in cartridge configured in a (Field Programmable Gate Arrays) FPGA integrated circuit chip, wherein the plug-in cartridge comprises a communication interface selected from one of a Universal Serial Bus (USB), a peripheral component interconnect express (PCIE), a mini serial AT attachment (mSATA) for communicating with a host electronic device selected from one of a personal computer, a server computer, a mobile terminal, a cloud-computing system to receive the encryption command or the decryption command and to encrypt or decrypt a storage device therein and data stored in the storage device.

13. A method for encrypting data and decrypting data using the apparatus of claim 11, comprising:

receiving an encryption command and an input clock signal from a crystal oscillator;

generating a frequency parameter in response to the encryption command and a base clock signal based on the input clock signal, the frequency parameter defining different timeframes corresponding to different frequencies;

generating an encryption clock signal based on the base clock signal and the frequency parameter, the encryption clock signal comprising a combination of different clock frequencies being different integer divisions of a base clock frequency associated with the base clock signal over multiple timeframes being different integer multiplications of cycle periods corresponding to the respective clock frequencies; and receiving plain data by sampling based on respective effective edges of the encryption clock signal.

14. The method of claim 13, wherein the effective edges of the encryption clock signal is selected to be either rising edges or falling edges of signal pulses with the different clock frequencies appeared over multiple different timeframes.

15. The method of claim 13, further comprising synchronizing the encryption clock signal and the base clock signal to make the effective edges of the encryption clock signal be aligned in phase with some effective edges of the base clock signal.

16. The method of claim 13, wherein generating a base clock signal based on the input clock signal comprises:
- generating at least two first clock signals based on the input clock signal;
- determining a timespan between two effective edges of two subsequent first clock signals based on time sequence of generating the at least two first clock signals;
- setting the timespan equal to a base-time unit; and
- generating a base clock signal with a clock frequency being an integer division of a base clock frequency defined by the base-time unit.

17. The method of claim 13, further comprising:
- generating a random binary sequence based on the base clock signal;
- combining the random binary sequence with the plain data based on the encryption clock signal to obtain a combined binary sequence; and
- encrypting the combined binary sequence based on a symmetric-encryption algorithm to obtain encrypted data.

18. The method of claim 17, wherein combining the random binary sequence with the plain data comprises:
- determining a first data in the random binary sequence and a second data in the plain data corresponding to a respective one of effective edges of the encryption clock signal; and
- replacing the first data with a respective second data to obtain the combined binary sequence.

19. The method of claim 16, further comprising:
receiving a decryption command;
- obtaining, in response to the decryption command, the frequency parameter and the base clock signal used for generating the encryption clock signal to obtain the encrypted data;
- generating a decryption clock signal based on the frequency parameter and the base clock signal, the decryption clock signal comprising a combination of different clock frequencies being different integer divisions of a base clock frequency associated with the base clock signal over multiple different timeframes;
- synchronizing the decryption clock signal and the base clock signal to make effective rising or falling edges of the decryption clock signal be aligned in phase with some effective rising or falling edges of the base clock signal;
- reading the encrypted data based on respective effective rising or falling edges of the base clock signal;
- sampling to-be-decrypted data decryption clock signal based on effective rising or falling edges of the decryption clock signal that are synchronized in phase with some of the effective rising or falling edges of the base clock signal; and
- decrypting the to-be-decrypted data to obtain the plain data.

* * * * *